United States Patent
Price (10) Patent No.: US 10,021,455 B2
(45) Date of Patent: Jul. 10, 2018

(54) SYSTEM FOR IDENTIFYING CONTENT AND DETERMINING VIEWERSHIP THEREOF AND ASSOCIATED METHODS

(71) Applicant: Sir Koko, LLC, Las Vegas, NV (US)

(72) Inventor: Robertson Price, New York, NY (US)

( * ) Notice: Subject to any disclaimer, the term of this patent is extended or adjusted under 35 U.S.C. 154(b) by 31 days.

(21) Appl. No.: 15/369,398

(22) Filed: Dec. 5, 2016

(65) Prior Publication Data
US 2017/0164052 A1   Jun. 8, 2017

Related U.S. Application Data

(60) Provisional application No. 62/263,119, filed on Dec. 4, 2015.

(51) Int. Cl.
| | |
|---|---|
| *H04N 7/16* | (2011.01) |
| *H04H 60/33* | (2008.01) |
| *H04H 60/56* | (2008.01) |
| *H04N 21/442* | (2011.01) |
| *H04N 21/4223* | (2011.01) |
| *H04N 21/234* | (2011.01) |
| *G06T 7/40* | (2017.01) |
| *H04N 21/258* | (2011.01) |
| *H04N 21/45* | (2011.01) |
| *H04N 21/44* | (2011.01) |
| *H04N 21/658* | (2011.01) |

(52) U.S. Cl.
CPC ....... *H04N 21/44218* (2013.01); *G06T 7/408* (2013.01); *H04N 21/23418* (2013.01); *H04N 21/25883* (2013.01); *H04N 21/4223* (2013.01); *H04N 21/44008* (2013.01); *H04N 21/4532* (2013.01); *H04N 21/6582* (2013.01)

(58) Field of Classification Search
CPC ......... H04N 21/44218; H04N 21/4223; H04N 21/23418; H04N 21/25883; H04N 21/4532; H04N 21/44008; H04N 21/6582; G06T 7/408
See application file for complete search history.

(56) References Cited

U.S. PATENT DOCUMENTS

| | | | |
|---|---|---|---|
| 2003/0018982 A1* | 1/2003 | Zeidler | H04N 5/4446 725/151 |
| 2003/0115591 A1* | 6/2003 | Weissmueller, Jr. | G06Q 30/0241 725/22 |
| 2010/0077420 A1* | 3/2010 | Nielsen | H04H 60/33 725/9 |
| 2012/0129574 A1* | 5/2012 | Reed | G06T 1/0021 455/556.1 |

(Continued)

*Primary Examiner* — Oschta Montoya
(74) *Attorney, Agent, or Firm* — Daniel C. Pierron; Widerman Malek PL (57) ABSTRACT

A method of identifying content and tracking viewership thereof comprising measuring a color content of a display device, defining a measured color content and determining an occupancy of a space associated with the display device, defining a determined occupancy. Where the determined occupancy indicated the occupancy by at least one person, the measured color content with is associated with the viewable content. Additionally, a viewership information database is updated responsive to the determined occupancy and the viewable content. In some embodiments, determining the color content may be performed by a luminaire in optical communication with the display device.

15 Claims, 8 Drawing Sheets

(56) References Cited

U.S. PATENT DOCUMENTS

| | | | |
|---|---|---|---|
| 2013/0156273 A1* | 6/2013 | Nielsen | H04N 21/4223 |
| | | | 382/118 |
| 2014/0161305 A1* | 6/2014 | Lee | G06K 9/00362 |
| | | | 382/103 |
| 2014/0189720 A1* | 7/2014 | Terrazas | H04N 21/44218 |
| | | | 725/12 |
| 2014/0325540 A1* | 10/2014 | Garza | H04N 21/44218 |
| | | | 725/12 |
| 2015/0089551 A1* | 3/2015 | Bruhn | H04N 7/106 |
| | | | 725/80 |
| 2016/0066034 A1* | 3/2016 | Hicks | H04N 21/44218 |
| | | | 725/12 |

* cited by examiner

SYSTEM FOR IDENTIFYING CONTENT AND DETERMINING VIEWERSHIP THEREOF AND ASSOCIATED METHODS

RELATED APPLICATIONS

This application claims the benefit under 35 U.S.C. § 119(e) of U.S. Provisional Patent Application Ser. No. 62/263,119 titled "System for Identifying Content and Determining Viewership Thereof and Associated Methods" filed Dec. 4, 2015, the entire contents of which/of each of which are incorporated herein by reference.

FIELD OF THE INVENTION

The present invention relates to systems and methods for identifying content that is being displayed on a display device, and for determining viewership of the identified content.

BACKGROUND

Determining viewership of content has long been a need in the content production industry, primarily for the purpose of demonstrating to advertisers that the fees associated with advertising during certain content are warranted. However, historic solutions to determining viewership of content have typically involved the installation of hardware that interfaces directly with the means for delivering the content to the display device on which the content is viewed. This requires additional hardware serving a single purpose and occupying space in the home, something many individuals wish to avoid. Accordingly, there is a need in the art to collect content display information without requiring the installation of additional equipment.

Furthermore, historic solutions are operable to monitor the content being viewed, but not the demographic information of individuals actually present in the room where the content is being displayed. Instead, such demographic information is collected by other means (typically a survey of the residents of the dwelling where the target display device is located) and is applied in a very general sense to all content that is displayed on the target display device. This results in inaccuracies in viewership information, as there is no way to tell which residents are actually viewing content, or if non-residents are viewing the content. Accordingly, there is a need in the art for a more accurate method of determining viewership information for content as it is being displayed.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a method of identifying content and tracking viewership thereof comprising measuring a color content of a display device, defining a measured color content and determining an occupancy of a space associated with the display device, defining a determined occupancy. Where the determined occupancy indicated the occupancy by at least one person, the measured color content with is associated with the viewable content. Additionally, a viewership information database is updated responsive to the determined occupancy and the viewable content. In some embodiments, determining the color content may be performed by a luminaire in optical communication with the display device.

In some embodiments the method further comprises creating a content fingerprint of the measured color content comprising a spectral power distribution of light emanating from the display device for a period of time. In another embodiment, the method may further comprise determining viewership information associated with the measured color content. The viewership information may comprise determining a number of individuals within the space associated with the display device. The viewership information may comprise at least one of age, height, sex, hair color, weight, race, and information regarding clothing of an individual within the space associated with the user display device. In some embodiments, determining viewership information associated with the measured color content is performed by a luminaire.

In some embodiments, the method may further comprise creating a content fingerprint of the measured color content comprising a spectral power distribution of light emanating from the display device for a period of time, determining viewership information associated with the measured color content, and generating and transmitting a transmission package comprising the content fingerprint and the viewership information. The method may further comprise receiving the transmission package and comparing the fingerprint comprised by the transmission package to a profile database. Upon determining there is a match of the fingerprint comprised by the transmission package in the profile database defining a matched profile, the transmission package with the viewable content associated with the matched profile may be recorded to a database file associated with the viewable content. Upon determining there is no match of the fingerprint comprised by the transmission package in the profile database, the transmission package may be stored. Receiving the transmission package may be defined as receiving a first transmission package, and the method may further comprise receiving a second transmission package and comparing the first and second transmission packages for consistency. Upon determining the first and second transmission packages are not consistent, the first and second transmission packages may be flagged. Comparing the transmission packages for consistency may comprise comparing at least one of the fingerprints comprised by each transmission package and comparing the viewership information comprised by each transmission package.

In some embodiments, measuring a color content of a display device, defining a measured color content may comprise measuring the color content of a first region of display device and measuring the color content of a second region of a display device. The method may further comprise determining a color differential between the color content of the first region of the display device and the color content of the second region of the display device. The color differential may be a difference in at least one of hue, saturation, contrast, tint, color temperature, and brightness.

In some embodiments, the method may further comprise receiving a content transmission from at least one of a content source and a content broadcaster, the content transmission comprising a received content, and creating a profile for the received content, the profile comprising a fingerprint for the received content. The profile may then be added to a profile database. The method may further comprise creating a profile for the received content, the profile comprising a plurality of fingerprints for the received content.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention text, as shown and described by the various figures and accompanying text, provides systems and methods for identifying content being displayed on a user display device, and for determining the viewership of the identified content. Furthermore, the invention may further be directed to the identification of applications presently in use by a user on a user computerized device.

Figure 1:
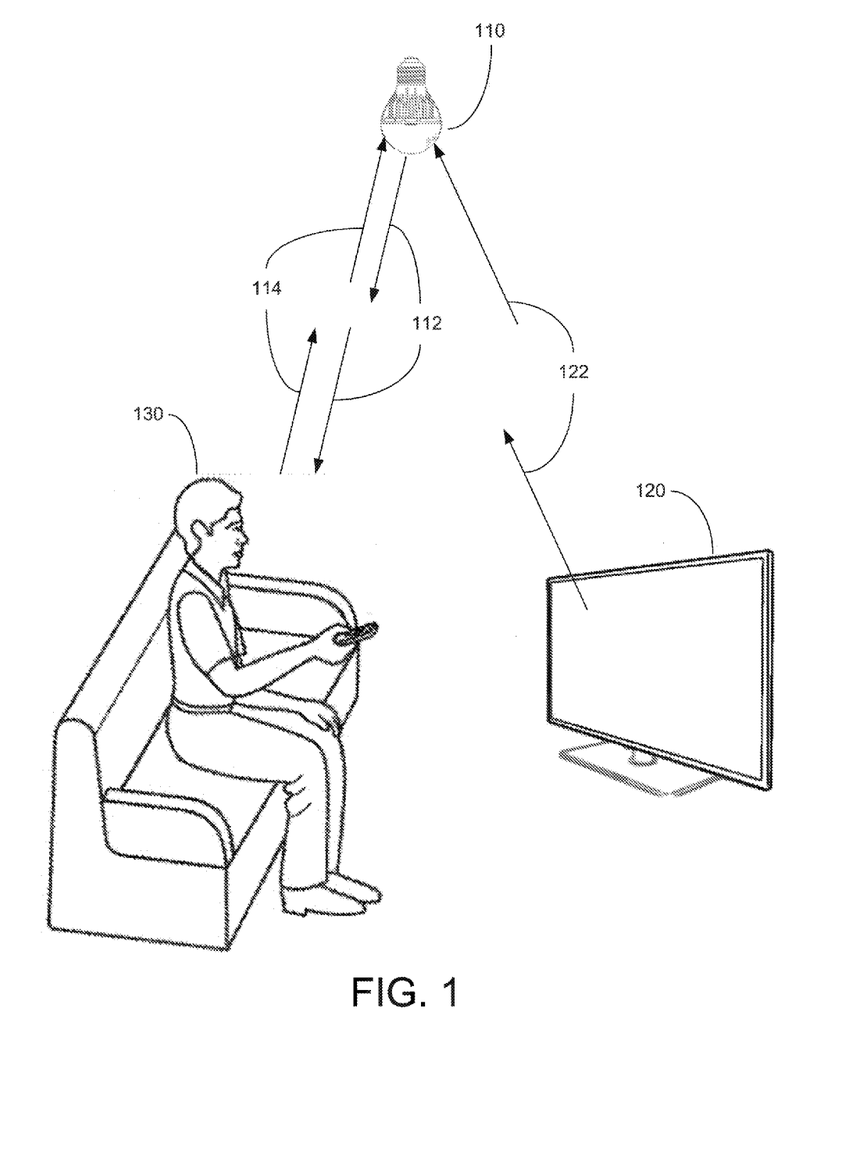
FIG. 1 is an environmental view of a content identification and viewership measurement system according to an embodiment of the invention.

Referring now to FIG. 1, an environmental view of an embodiment of the invention is presented. In the present embodiment, a detection device 110 is positioned in optical communication with each of a user display device 120 and a user 130. In the present embodiment, the detection device 110 may take the form of a lighting device, for example a luminaire for use in general residential, commercial, or retail purposes. In the present embodiment, the detection device 110 may be a luminaire conforming to the standard form factor, for instance, an A19 light bulb. Any other configuration of the detection device 110, including any other standardized bulb form factor or fixture as is known in the art, is contemplated and included within the scope of the invention.

The detection device 110 may be configured to emit electromagnetic radiation 112. The characteristics of the emitted electromagnetic radiation 112 may be such that they may enable the detection device 110 to determine the occupancy of the field of view of the detection device 110. More information regarding the determination of occupancy may be found in U.S. patent application Ser. No. 13/464,345 titled Occupancy Sensor and Associated Methods filed May 2, 2012, U.S. Pat. No. 8,680,457 titled Motion Detection System and Associated Methods Having At Least One LED Of Second Set of LEDs to Vary its Voltage filed Jan. 11, 2013, and U.S. Pat. No. 8,492,995 titled Wavelength Sensing Lighting System and Associated Methods filed Oct. 7, 2011, the contents of each of which are incorporated herein by reference in their entireties, except to the extent disclosure therein is inconsistent with disclosure herein.

More specifically, the detection device 110 may be able to determine the number of occupants in the field of view. Additionally, the detection device 110 may be configured to determine/estimate certain demographic information regarding each individual identified as an occupant in the field of view. Examples of it demographic information that may be determined/estimated by the detection device 110 includes, but is not limited to, age, height, sex, hair color, weight, race, information regarding clothing, and the like. More specifically, the detection device 110 may be configured to emit electromagnetic radiation across a broad spectrum, which may comprise the visible spectrum, the infrared spectrum, and the ultraviolet spectrum, and measure the reflectance thereof to determine the above described demographic information. In some embodiments, the detection device 110 may be configured to reflected light 114, create a data file regarding the sensed reflected light 114, and transmit the data file to a remote computerized device, the remote computerized device be configured to process the data file to determine the demographic information and/or occupancy information.

Additionally, the detection device 110 may be configured to sense content light 122 emitted from the user display device 120. More specifically, the detection device 110 may be configured to measure the intensity of light across the visible spectrum emitted from the user display device 120, the light being defined as the content light 122. The detection device 110 may further be configured to create a fingerprint of the content light 122 which may then be transmitted to a remote computerized device, as will be described in greater detail hereinbelow. The fingerprint of the content light 122 may be defined as the spectral power distribution of light identified as emanating from the user display device 120 for a certain length of time. The length of time may be any length as is practicable for differentiating the content presently displayed by the user display device 120 from other content as might be displayed by the user display device 120. The length of time may be within the range from one millisecond to one minute.

In some embodiments, the detection device 110 may be configured to apply a correction factor to the content light 122. The correction factor may be applied when the detection device 110 detects that a color adjustment has been made to the user display device 120. Types of color adjustments that may be made, and for which a correction factor may be applied, include hue, saturation, brightness, gamma, contrast, tint, and color temperature. This list is not exhaustive and other qualities of color content may be accounted for in the correction factor.

The user display device 120 may be any device that visually depicts content. Types of devices include, without limitation, televisions, such as CRT, LCD, LED, OLED, and plasma displays, computer monitors, tablet displays, smart phone displays, and the like.

In order to minimize network traffic, the data file comprising sensed reflected light 114 and the fingerprint of the content may be transmitted as a single transmission package to a remote computerized device.

Figure 2:
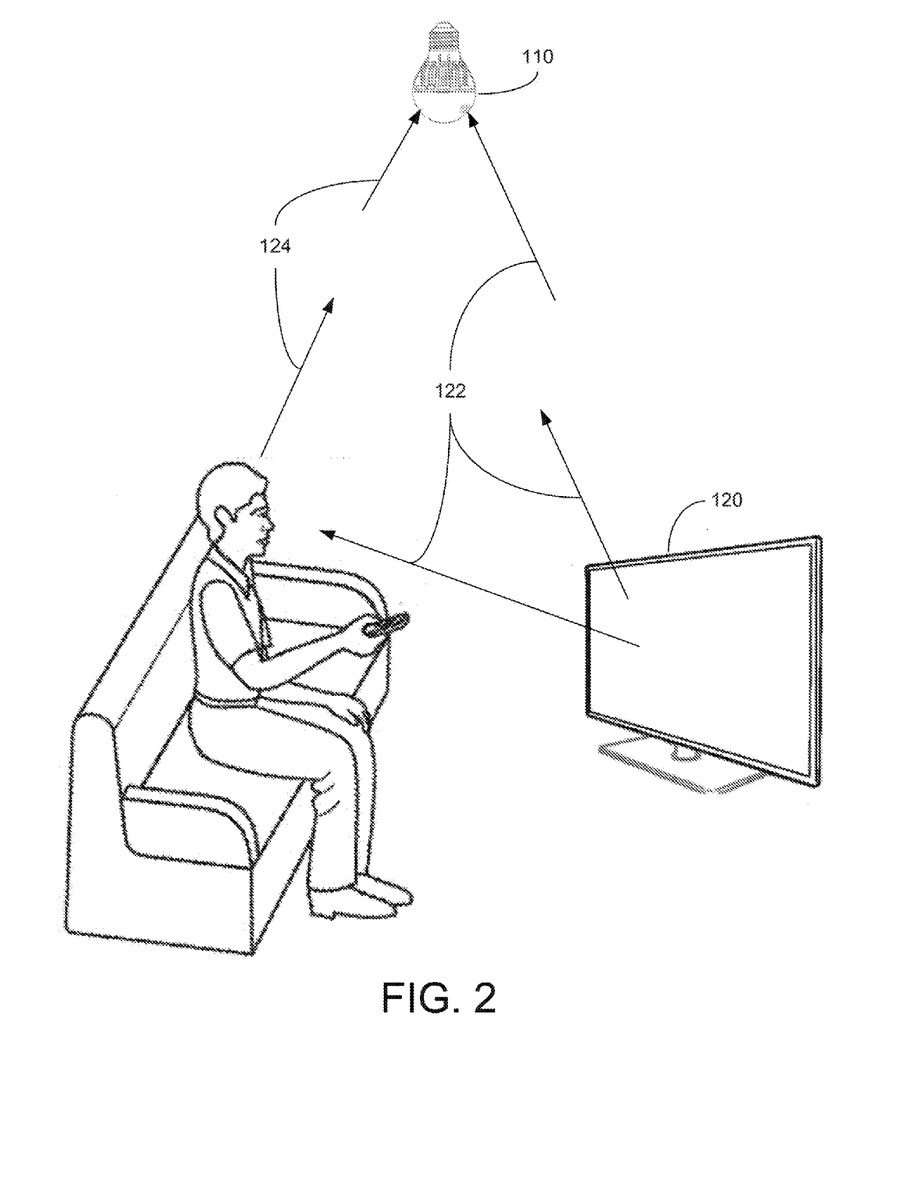
FIG. 2 is an environmental view of a content identification and viewership measurement system according to an embodiment of the invention.

Referring now to FIG. 2, another operation mode of the present embodiment is depicted. The detection device 110 may be configured to measure light emitted from the user display device 120 as in FIG. 1. However, in the present operating mode, the detection device 110 is not emitting electromagnetic radiation. In this mode, the detection device 110 may obtain demographic information regarding the user 130 by measuring reflected light 124 from the user 130 that originates as content light 122 emitted from the user display device 120.

Figure 3:
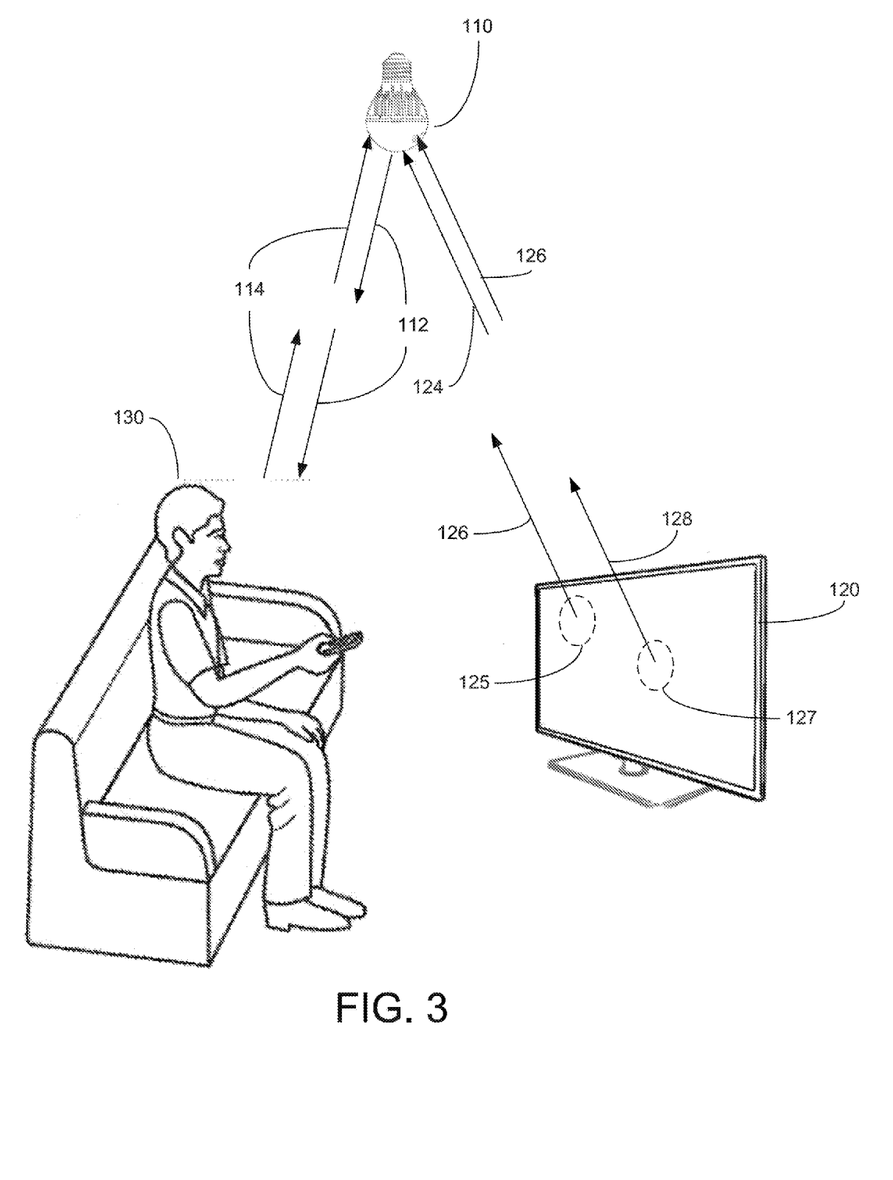
FIG. 3 is an environmental view of a content identification and viewership measurement system according to an embodiment of the invention.

Referring now to FIG. 3, another method of operation of the present embodiment is depicted. The detection device 110 may be configured to measure light emitted from the user display device 120 as in FIG. 1, but to differentiate light emitted from a first region 125, defined as a first region light 126, from light emitted from a second region 127, defined as a second region light 128. In such embodiments, the detection device 110 may be configured to measure the content light comprising the first region light 126 and the second region light 128. More specifically, the detection device 110 may be configured to determine the spectral power distribution of each of the first region light 126 and the second region light 128. Furthermore, the detection device 110 may be configured to create a fingerprint comprised of the measure content light of each of the first region light 126 and the second region light 128, the relationship therebetween enabling the identification of the content associated therewith. In some embodiments, the fingerprint may comprise a color differential between the first region light 126 and the second region light 128. More specifically, the differences between the spectral power distributions between the first region light 126 and the second region light 128 may be included, or may comprise, the fingerprint. In this way, any color adjustments made by the user display device (such as hue, saturation, contrast, tint, color temperature, brightness, etc.) may be obviated or may have a reduced influence on the analysis of the fingerprint.

While first and second regions 125, 127 are shown, it is contemplated and included within the scope of the invention that any number of regions of the user display device 120 may be sampled and light emitted therefrom measured.

Figure 4:
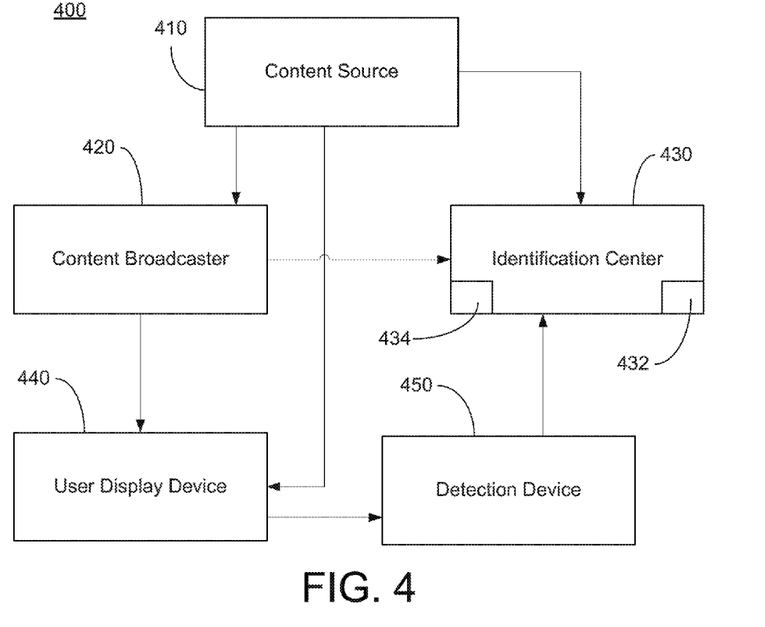
FIG. 4 is a schematic view of a communicative network according to an embodiment of the invention.

Referring now to FIG. 4, a communicative network 400 according to an embodiment of the invention is presented. The network 400 may comprise a content source 410, a content broadcaster 420, an identification center 430, a user display device 440, and a detection device 450. While various interconnections are shown among the various elements of the network 400 using a common representation of those connections, it is intended that the nature of the connection depends on the nature of the elements involved. Types of connections include electrical communication, telecommunication, computerized communication, broadcast communication, optical communication, and any other means of conveying information, using any electromagnetic medium, as is known in the art. Furthermore, the connection may be in the form of delivery of a tangible medium that may be used in transportation of the content in any form, including digital, analog, or other representation.

The content source 410 may be the original source for content of the network 400. Examples of a content source 410 include a content creator, a domestic content provider, a content repository, and the like. The content source 410 may be positioned in communication with the identification center 430. Accordingly, the identification center 430 may be able to receive content from the content source 410. Furthermore, the content source 410 may, in some embodiments, transmit content directly to the user display device 440.

The identification center 430 may be able to analyze content received from the content source 410 so as to create a color content profile for each content article received from the content source 410. The color content profile may be stored in a profile database 432 associated with the identification center 430. The profile database 432 may be accessible so as to be compared with a content fingerprint so as to determine if there is a match between a color content profile on the profile database 432 and the content fingerprint. In some embodiments, the profile database 432 may be configured to be accessible by a computerized device associated with the identification center 430. Additionally, the profile database 432 may be configured to be accessible by a computerized device not associated with the identification center 430, for example, the detection device, a computerized device associated with the content source 410 and/or the content broadcaster 420, or a computerized device associated with some other third party, including, but not limited to, advertising agencies, rating agencies, demography agencies, media companies, internet service providers, government agencies, security agencies, law enforcement agencies, and the like.

Additionally, the identification center 430 may further comprise a content viewership information database 434. The content viewership information database 434 may comprise information related to the viewership of content that may be found within the profile database 432. The viewership information may include the number of viewers of the content, as well as demographic information regarding the viewers of the content, including demographic categories as described hereinabove. Similarly, the content viewership information database 434 may be configured to be accessible by a computerized device associated with the identification center 430. Additionally, the computerized database 434 may be configured to be accessible by a computerized device not associated with the identification center 430, for example, the detection device, a computerized device associated with the content source 410 and/or the content broadcaster 420, or a computerized device associated with some other third party, including, but not limited to, advertising agencies, rating agencies, demography agencies, media companies, internet service providers, government agencies, security agencies, law enforcement agencies, individuals, such as owners and/or occupants of the property associated with the location of the display device displaying the content, and the like.

The content broadcaster 420 may be any entity that receives content from the content source 410 and then re-transmits the content. This includes many content viewing entities, such as satellite television and internet service providers, cable television and internet service providers, local over-the-air broadcasters, and the like. The content broadcaster 420 may transmit content received from the content source 410 to the user display device 440, and/or, in some embodiments, to the identification center 430.

The user display device 440 may be configured to receive and display content for viewing by a user from either or both of the content source 410 and the content broadcaster 420. The user display device 440 may be positioned in optical communication with the detection device 450, as depicted in FIGS. 1-2. The detection device 450 may create a content fingerprint as described herein. Furthermore, the detection device 450 may be positioned in communication with the identification center 430. The communication therebetween may be accomplished by any method of communication as is known in the art, including, but not limited to, connection over a network, such as the Internet. Accordingly, the detection device may include a network communication device capable of performing such communication.

Additionally, it is contemplated and included within the scope of the invention that the user display device 440 may comprise the detection 450, such that they are combined in a single housing, structure, or are otherwise a single device installed within the home.

Figure 5:
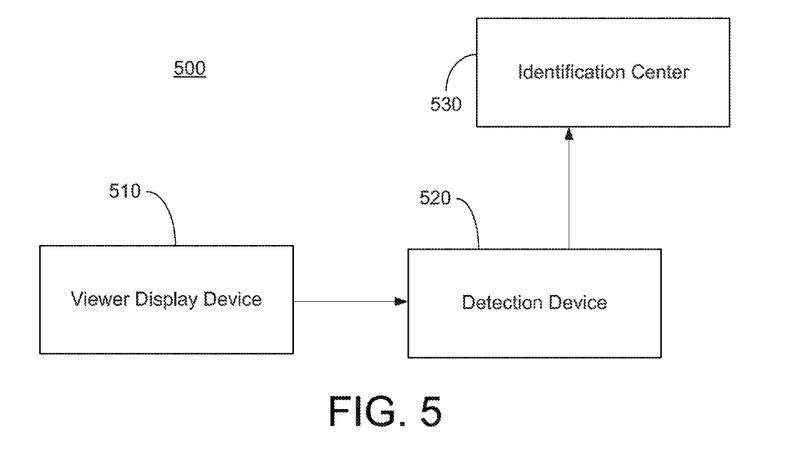
FIG. 5 is a schematic view of a communicative network according to an embodiment of the invention.

Referring now to FIG. 5, an alternative embodiment of a communicative network 500 is presented. The communicative network 500 may include a viewer display device 510 positioned in communication, such as optical communication, with a detection device 520, which may in turn be positioned in communication with an identification center 530, as described hereinabove. In the present embodiment, content that originates with the user display device may be observed and fingerprinted by the detection device 520, and transmitted to the identification center 530 for catalogued and analysis. Types of analysis may include, but is not limited to, image detection and identification, text recognition, social media use, and the like.

Figure 6:
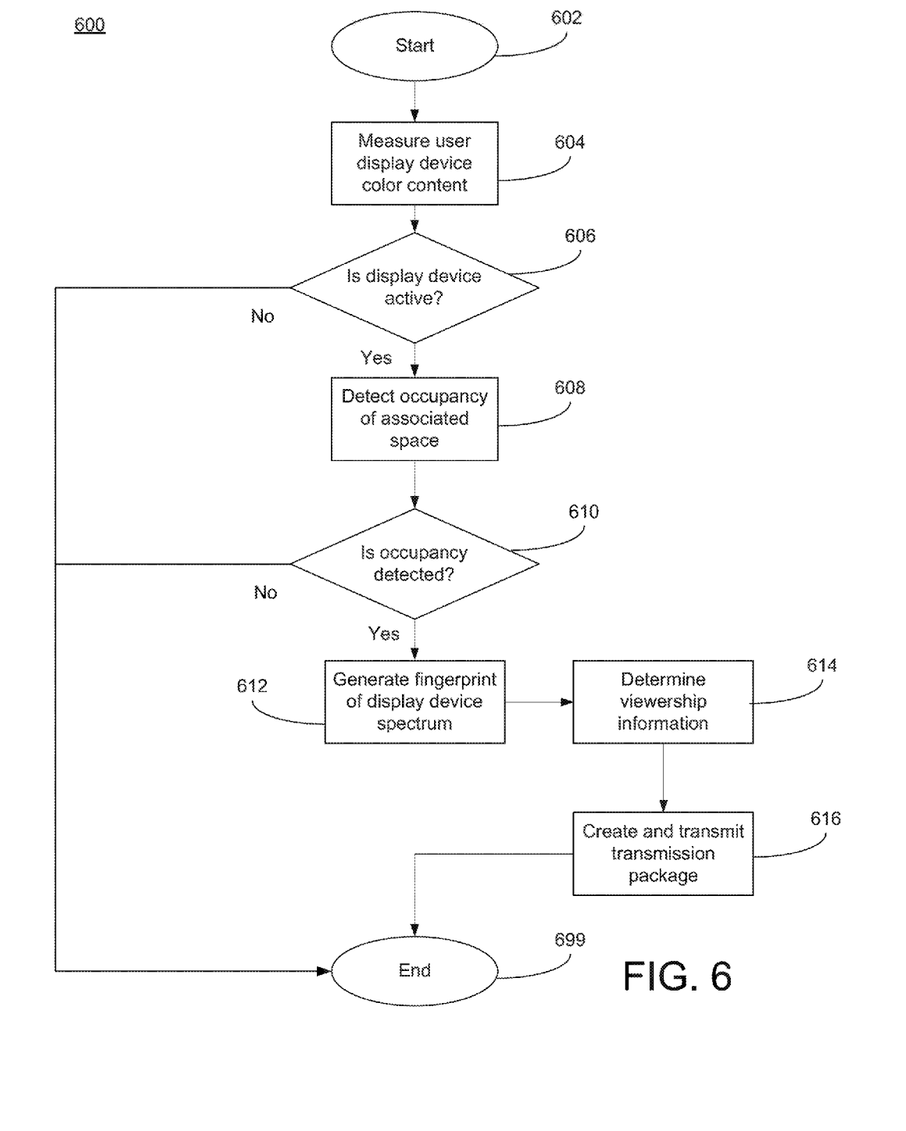
FIG. 6 is a flowchart illustrating a method of measuring spectral content and determining viewership of media according to an embodiment of the invention.

Referring now to FIG. 6 a flowchart illustrating a method 600 of generating a content fingerprint is presented. Beginning at Block 602, the color content of a user display device may be measured at Block 604 by a detection device. It is contemplated and included within the scope of the invention that a detection device, as described hereinabove, may be programmed to identify and differentiate light that is emitted from a user display device from ambient light or light generated by another light source within the field of view of the detection device. At Block 606, the detection device may determine if the display device is active. That is to say, the detection device may determine whether the display device is on and displaying content. In some embodiments, the detection device may determine if the content being displayed by the user display device is paused or in active playback.

If it is determined at Block 606 that the user display device is not active, the method 600 may end at Block 699. If it is determined at Block 606 that the user display device is active, the method 600 may continue at Block 608 where the detection device may determine the occupancy of the space associated with the user display device. Continuing at Block 610, the detection device may determine if occupancy is detected within the space associated with the user display device. If occupancy is not detected, the method 600 may end at Block 699. If occupancy is detected, the method 600 may continue at Block 612, where a fingerprint comprising the color content measured at Block 604, and/or results of analyses performed thereon, may be generated. At Block 614, the detection device may determine the viewership information based on the detected occupancy as performed at Block 608. Continuing at Block 616, a transmission package comprising the fingerprint and the viewership information may be created and transmitted from the detection device to an identification center or other recipient location as described hereinabove. The method 600 may then end at Block 699.

It is contemplated that, in some embodiments, a detection of non-occupancy may still result in the transmission of a transmission package with viewership information indicating such non-occupancy.

Figure 7:
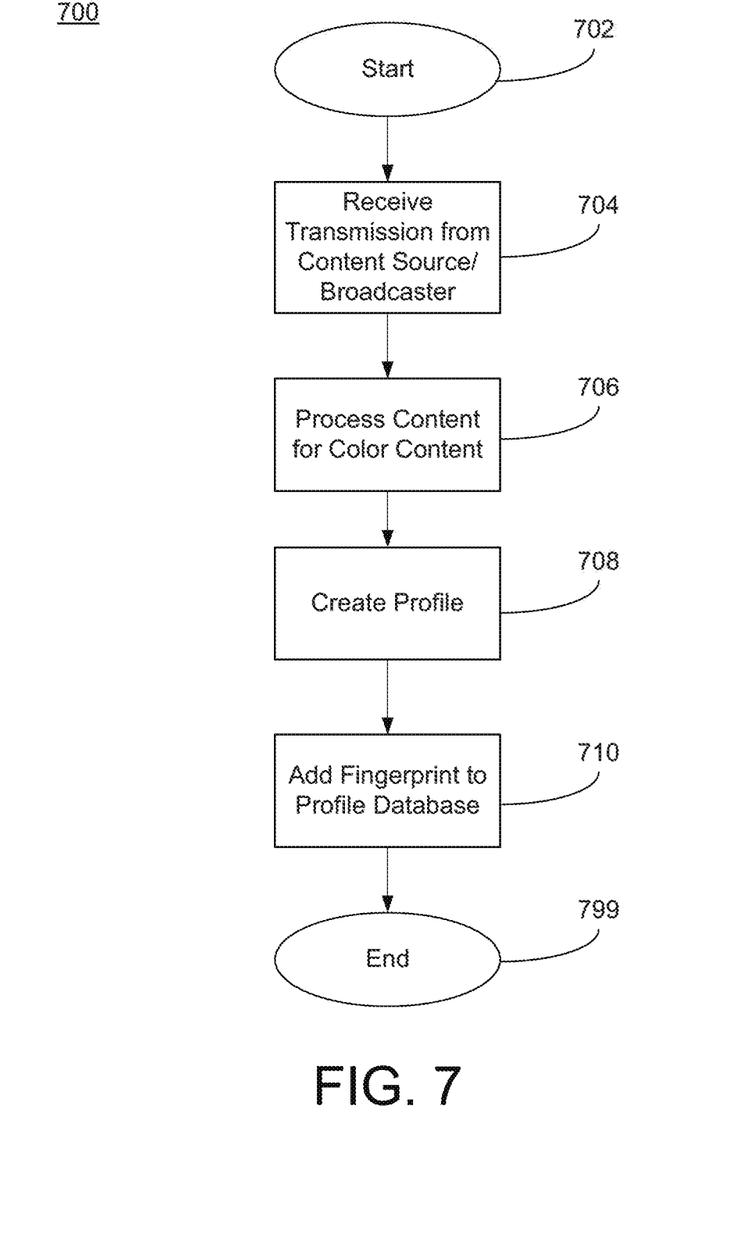
FIG. 7 is a flowchart illustrating the reception and creation of a content profile database according to an embodiment of the invention.

Referring now to FIG. 7, a method 700 of creating a fingerprint according to the invention is presented. The following method may be performed by an identification center as described hereinabove. Beginning at Block 702, the method 700 may include receiving a content transmission from at least one of a content source and a content broadcaster at 704. The content may be received in any form, including receiving the content as a single data file over a data network, such as the internet, or from a data storage device, such as a hard drive, optical disc, flash drive, and the like. Additionally, the content may be received as an over-the-air transmission, with each frame being received and stored locally.

At Block 706, the received content may be processed for color content. The processing of the content may be performed so as to produce data regarding the color content of the content that is conducive to the creation of a profile for the content, which may then be compared to the fingerprints generated by detection devices for identification of content. The processing may include at least one of determining the total color content for each frame of the content or a sampling thereof, i.e. one frame per second, etc., a color content for a plurality of regions of the content, and color content as may be displayed on a user display device, which may include a number of adjustments to the original color content, such as adjustments to the hue, saturation, contrast, tint, color temperature, brightness, etc. Continuing at Block 708, a profile of the content may be created based on the processing of the content, and the profile may be added to a profile database at Block 710. The method 700 may then end at Block 799.

Figure 8:
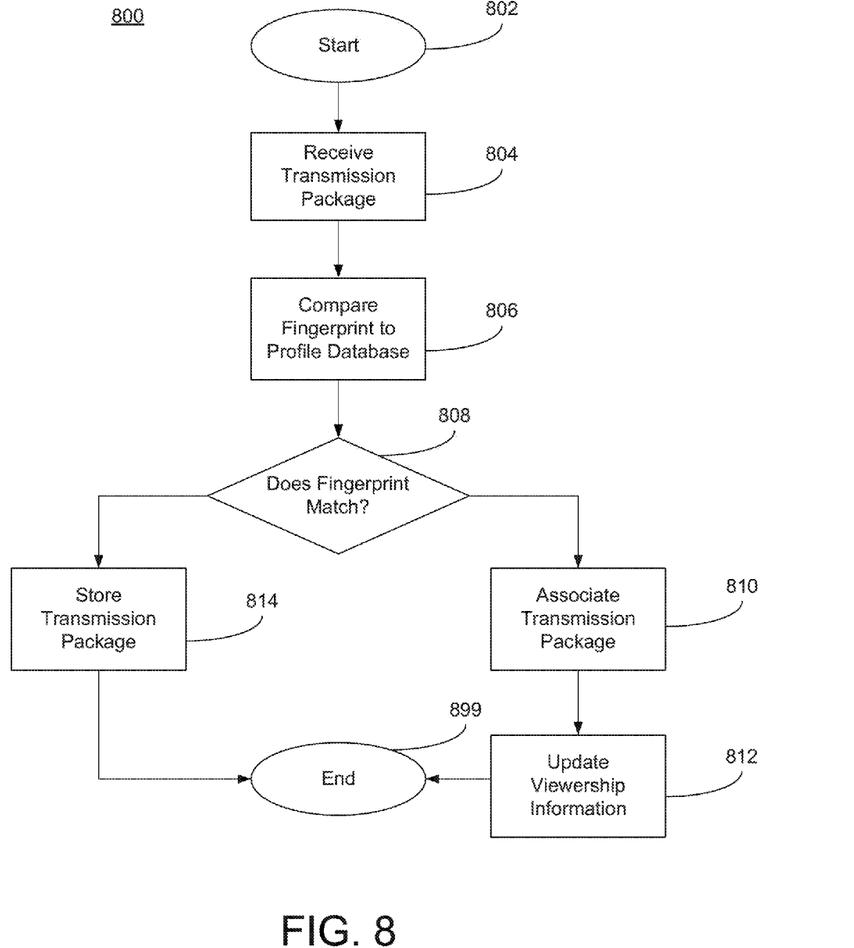
FIG. 8 is a flowchart illustrating a method of identifying content and attributing viewership thereof according to an embodiment of the invention.

Referring now to FIG. 8, a method 800 of performing a content fingerprint analysis according to the invention is presented. The method 800 may begin at Block 802, with a transmission package being received from a detection device at Block 804. Continuing at Block 806, a fingerprint comprised by the transmission package may be compared to the fingerprints comprised by the profile database. The nature of the comparison may depend on the type of data comprised by the fingerprint. Accordingly, the comparison of the fingerprint to the profile database may include an identification of the type of data comprised by the fingerprint.

If, at Block 808, a match for the fingerprint is found in the profile database, then the method 800 may continue at Block 810 with the association of the transmission package with the content associated with the fingerprint in the profile database that matched the fingerprint received at Block 804. The association of the transmission package may include the recordation of the transmission package to a database file associated with the content, such as in a content viewership information database as described hereinabove. Continuing at Block 812, the viewership information for the associated content may be updated to include the viewership information included in the transmission package received at Block 804. The inclusion of the viewership information may include updating demographic information of viewers of the content, including demographic categories as described hereinabove. The method 800 may the end at Block 899.

If, at Block 808, a match for the fingerprint is not found in the profile database, the method 800 may continue at Block 814, where the transmission package may be stored for future attempts at matching the fingerprint to associate content with the transmission package. The method 800 may then end at Block 899.

Figure 9:
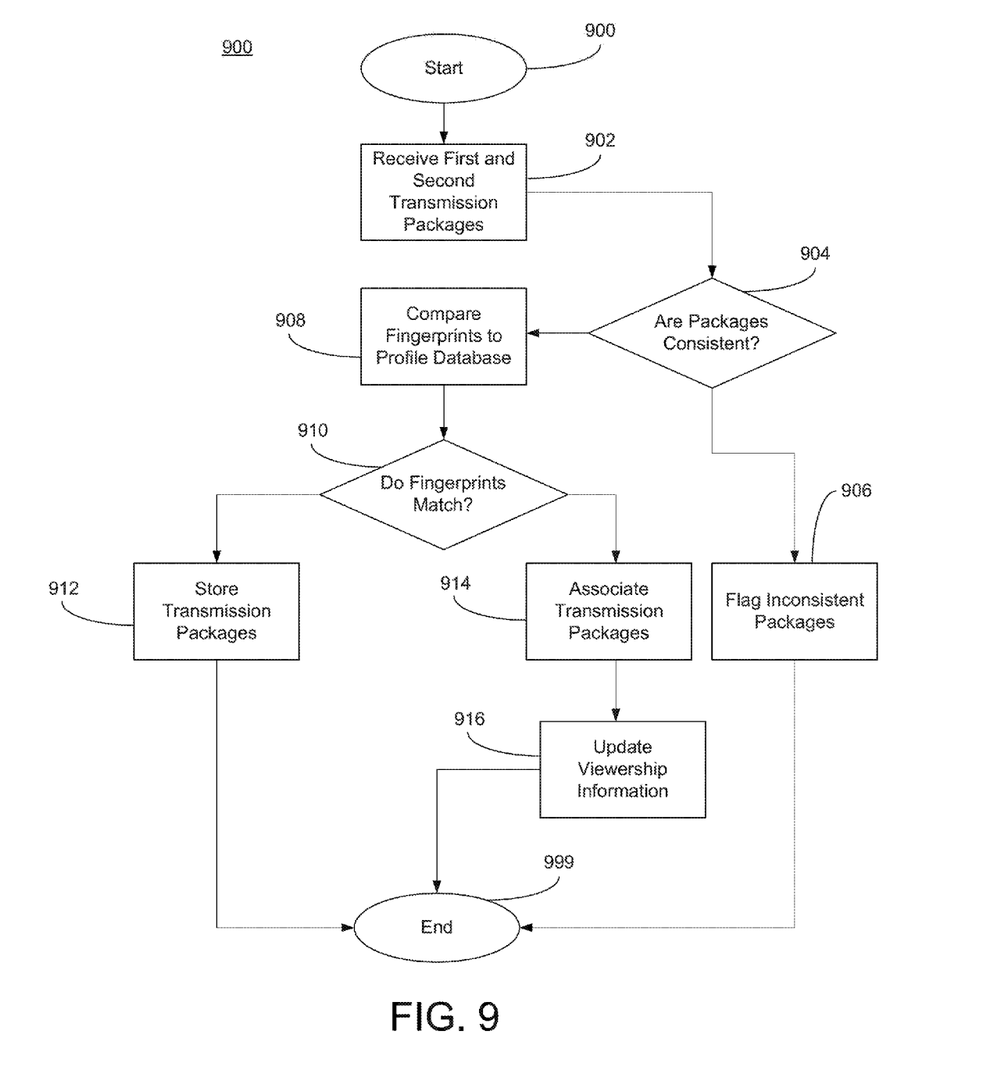
FIG. 9 is a flowchart illustrating an additional method of identifying content and attributing viewership thereof according to an embodiment of the invention.

Referring now to FIG. 9, a method 900 of performing a content fingerprint analysis according to the invention is presented. The method 900 may begin at Block 902, with receiving first and second transmission packages at Block 904. The first and second transmission packages may be received from first and second detection devices, respectively, that are in optical communication with the same user display device. At Block 904, the transmission packages may be compared for consistency. The comparison may be on one or both of the fingerprint and the viewership information comprised by the respective transmission packages. An associated threshold for consistency may be utilized in performing the comparison. The threshold for consistency may depend on the data being compared, e.g. the color content, the demographic information, etc., and one or more thresholds may be included for comparison of different data.

If, at Block 904, it is determined that the packages are not consistent, the method 900 may continue at Block 906 where the inconsistent packages may be flagged for subsequent analysis and/or deletion. The method 900 may then end at Block 999.

If, at Block 904, it is determined that the packages are consistent, the method 900 may continue at Block 908 where one or more of the fingerprints of the first and second transmission packages may be compared to the profile database. Then, at Block 910, it may be determined if one or more of the fingerprints matches a profile in the profile database.

The comparison of the fingerprints to the profile database may include a profile threshold, to enable a certain degree of tolerance of differences between the profile for content and the fingerprints that may be generated by a detection device detecting the content. The profile threshold may be different than the threshold for determining the consistency of the transmission packages utilized at Block 904. Accordingly, it is contemplated and included within the scope of the invention that while the transmission packages may be determined to be consistent at Block 904, they may not generate the same matching result at Block 910. Accordingly, a user preference may be included in the method 900, with the options being, where two different content profiles are matched at Block 910, selecting one of the content profiles with a greater confidence rating than the other match or storing the transmission packages for subsequent analysis, and where one fingerprints results in a match for one fingerprint and no match for the other, selecting the matched content or storing the transmission packages for subsequent analysis.

If, at Block 910, one or neither of the fingerprints matches, then the method 900 may continue at Block 912 where the transmission packages may be stored for subsequent analysis. The method 900 may then end at Block 999.

If, at Block 910, one or both of the fingerprints match a profile in the profile database, the method 900 may continue at Block 914 where one or both of the transmission packages may be associated with the content, as described hereinabove. Where both transmission packages are associated, it is contemplated that their mutual association will not result in the duplication of any demographic information comprised thereby, i.e. the number of viewers will not be duplicated. Continuing at Block 916, the viewership information for the associated content may be updated with the viewership information comprised by the first and second transmission packages. The method 900 may then end at Block 999.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

That which is claimed is:

1. A method of identifying content and tracking viewership thereof comprising:
   measuring a color content of a display device, defining a measured color content;
   determining an occupancy of a space associated with the display device, defining a determined occupancy;

where the determined occupancy indicated the occupancy by at least one person, associating the measured color content with viewable content;
updating a viewership information database responsive to the determined occupancy and the viewable content;
creating a content fingerprint of the measured color content comprising a spectral power distribution of light emanating from the display device for a period of time;
determining viewership information associated with the measured color content;
generating and transmitting a transmission package comprising the content fingerprint and the viewership information;
receiving the transmission package;
comparing the fingerprint comprised by the transmission package to a profile database;
upon determining there is a match of the fingerprint comprised by the transmission package in the profile database defining a matched profile, recording the transmission package with the viewable content associated with the matched profile to a database file associated with the viewable content; and
upon determining there is no match of the fingerprint comprised by the transmission package in the profile database, storing the transmission package.

2. The method of claim 1 further comprising creating a content fingerprint of the measured color content comprising a spectral power distribution of light emanating from the display device for a period of time.

3. The method of claim 1 further comprising determining viewership information associated with the measured color content.

4. The method of claim 3 wherein determining viewership information comprises determining a number of individuals within the space associated with the user display device.

5. The method of claim 4 wherein the viewership information comprises at least one of age, height, sex, hair color, weight, race, and information regarding clothing of an individual within the space associated with the display device.

6. The method of claim 3 wherein determining viewership information associated with the measured color content is performed by a luminaire.

7. The method of claim 1 wherein receiving the transmission package is defined as receiving a first transmission package, further comprising:
receiving a second transmission package;
comparing the first and second transmission packages for consistency; and
upon determining the first and second transmission packages are not consistent, flagging the first and second packages.

8. The method of claim 7 wherein comparing the transmission packages for consistency comprises comparing at least one of the fingerprints comprised by each transmission package and comparing the viewership information comprised by each transmission package.

9. The method of claim 1 wherein measuring a color content of a display device, defining a measured color content comprises:
measuring the color content of a first region of the display device; and
measuring the color content of a second region of the display device.

10. The method of claim 9 further comprising determining a color differential between the color content of the first region of the display device and the color content of the second region of the display device.

11. The method of claim 10 wherein the color differential is a difference in at least one of hue, saturation, contrast, tint, color temperature, and brightness.

12. The method of claim 1 further comprising:
receiving a content transmission from at least one of a content source and a content broadcaster, the content transmission comprising a received content;
creating a profile for the received content, the profile comprising a fingerprint for the received content; and
adding the profile to a profile database.

13. The method of claim 12 further comprising creating a profile for the received content, the profile comprising a plurality of fingerprints for the received content.

14. The method of claim 1 wherein the measuring the color content of the display device is performed by a luminaire in optical communication with the display device.

15. A method of identifying content and tracking viewership thereof comprising:
measuring a color content of a display device, defining a measured color content;
determining an occupancy of a space associated with the display device, defining a determined occupancy;
where the determined occupancy indicated the occupancy by at least one person, creating a content fingerprint of the measured color content comprising a spectral power distribution of light emanating from the display device for a period of time; and
determining viewership information associated with the measured color content; and
generating and transmitting a transmission package comprising the content fingerprint and the viewership information;
receiving the transmission package;
comparing the fingerprint comprised by the transmission package to a profile database;
upon determining there is a match of the fingerprint comprised by the transmission package in the profile database defining a matched profile, recording the transmission package with viewable content associated with the matched profile to a database file associated with the viewable content; and
upon determining there is no match of the fingerprint comprised by the transmission package in the profile database, storing the transmission package.

* * * * *